(12) United States Patent
Plankensteiner et al.

(10) Patent No.: US 6,519,579 B1
(45) Date of Patent: Feb. 11, 2003

(54) RELIABLE IDENTIFICATION WITH PRESELECTION AND REJECTION CLASS

(75) Inventors: Peter Plankensteiner, Erlangen (DE); Ulrich Dieckmann, Moehrendorf (DE)

(73) Assignee: Fraunhofer-Gesellschaft zur Foerderung der Angewandten Forschung E.V., Munich (DE)

(*) Notice: Subject to any disclaimer, the term of this patent is extended or adjusted under 35 U.S.C. 154(b) by 0 days.

(21) Appl. No.: 09/381,064

(22) PCT Filed: Mar. 10, 1998

(86) PCT No.: PCT/DE98/00708

§ 371 (c)(1),
(2), (4) Date: Feb. 7, 2000

(87) PCT Pub. No.: WO98/40825

PCT Pub. Date: Sep. 17, 1998

(30) Foreign Application Priority Data

Mar. 10, 1997 (DE) .......................... 197 09 819
Oct. 17, 1997 (DE) .......................... 197 46 077

(51) Int. Cl.$^7$ ............................... G06N 5/02
(52) U.S. Cl. .................... 706/45; 706/20; 382/170; 382/226
(58) Field of Search ............... 706/45, 20; 209/555; 382/170, 226

(56) References Cited

U.S. PATENT DOCUMENTS

| | | | | |
|---|---|---|---|---|
| 4,166,540 A | * | 9/1979 | Marshall | 209/555 |
| 5,329,596 A | * | 7/1994 | Sakou et al. | 382/226 |
| 5,359,699 A | * | 10/1994 | Tong et al. | 706/20 |
| 5,987,170 A | * | 11/1999 | Yamamoto et al. | 382/170 |

FOREIGN PATENT DOCUMENTS

DE  38 34 869 C2  8/1996

OTHER PUBLICATIONS

Neimann, Heinrich: "Information Processing in Technical, Biological and Economic Systems: Methods of Pattern Recognition" *Akademische Verlagsgesellschaft*, Frankfurt am Main 1974, pp. 410–414, portion 4.3.2.3.

Schurmann J: "Zur Zuruckweisung zweifelhafter Zeichen" *Nachrichtentechnische Zeitschrift*, Mar. 1973, West Germany, vol. 26, No. 3, pp. 137–144, XP002081339 ISSN 0027–707X.

Schwerdtmann W: "Reduktion Des Klassifikationsfehlers Durch Angepasste Musterentwicklung" *NTZ Nachrichtentechnische Zeitschrift*, vol. 27, No. 6, 1974, pp. 233–238, XP002067426.

Fujimoto Y et al: "Recognition of Handprinted Characters by Nonlinear Elastic Matching" *3rd International Joint conference on Pattern Recognition*, Coronada, Ca, USA, Nov. 8–11, 1976, pp. 113–118, XP002081340 1976, New York, NY, USA, IEEE.

(List continued on next page.)

*Primary Examiner*—Wilbert L. Starks
(74) *Attorney, Agent, or Firm*—Duane Morris LLP

(57) ABSTRACT

Disclosed is a method for classifying samples wherein the information content of a sample is divided up into two information areas. The first area contains necessary information and the second area contains sufficient information. An initially imprecise preselection concerning a plurality but extremely limited number of classes is made through the necessary information area. After said preselection, identification occurs with the sufficient information area in order to pinpoint the initially imprecise preselection in relation to an effective target class. This enables classification quality to be improved by means of new classifiers or new principal formulations of classification formulations.

15 Claims, 1 Drawing Sheet

OTHER PUBLICATIONS

Fleming M.K. et al: "Categorization of Faces Using Unsupervised Feature Extraction" *International Joint Conference on Neural Networks (IJCNN)*, San Diego, Jun. 17–21, 1990, vol. 2, Jun. 17, 1990, pp. 65–70, XP000144325 Institute of Electrical and Electronics Engineers.

Wagner T. et al: "Sensor–fusion for Robust Identification of Persons: A field Test" *Proceedings of the International Conference on Image Processing (ICIP)*, Washington, Oct. 23–36, 1995, vol. 3, Oct. 23, 1995, pp. 516–519, XP000623197 Institute of Electrical and Electronics Engineers, para. 2, Synergetic Computer as a Classifier.

Dieckmann U. et al: "SESAM: a biometric person identification system using sensor fusion" *Audio– and Video–Based Biometric Person Authentication. First International Conference, AVBPA '97*, Proceedings, Proceedings of First International Conference on Audio and Video Based Biometric Person Authentication (AVBPA), 301–310, XP002081341, ISBN 3–540–62660–3, 1997, Berlin, Germany, published by Verlag, Germany.

* cited by examiner

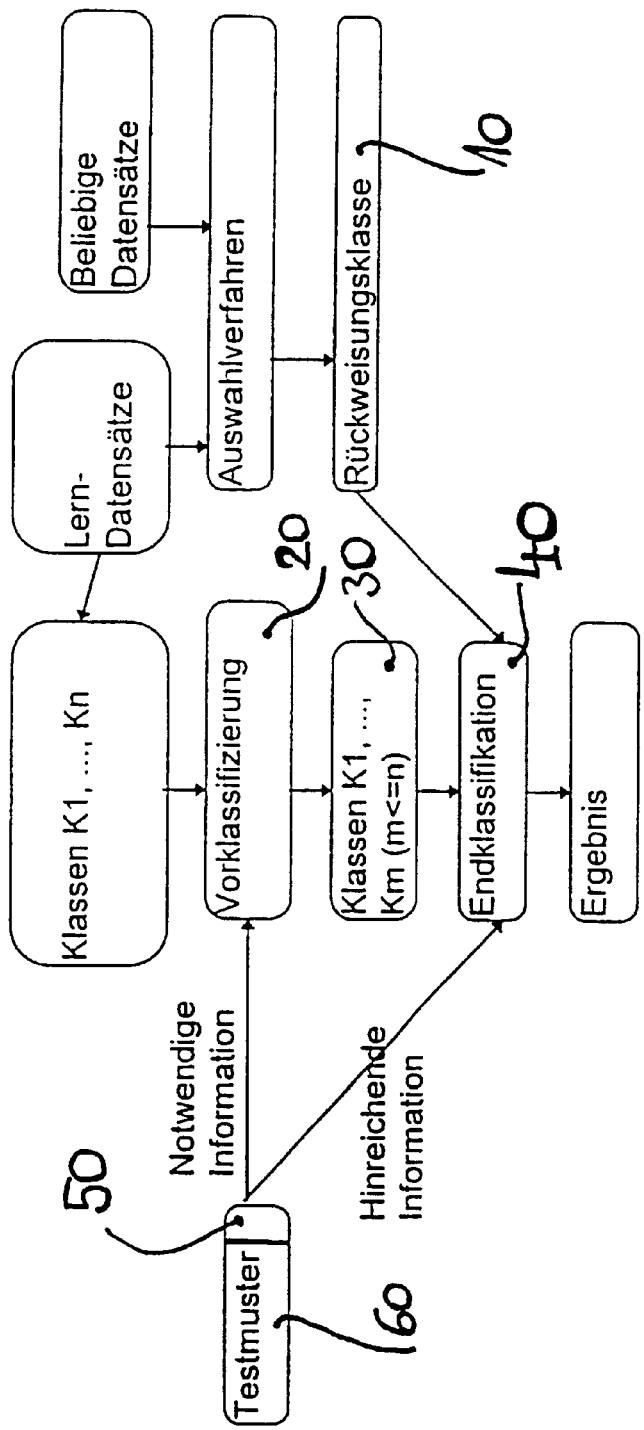

RELIABLE IDENTIFICATION WITH PRESELECTION AND REJECTION CLASS

A classification of data sets (e. g. picture data, speech signals) is the basis of an "intelligent" computer performance. Numerous fields of use exist, e. g. industrial production, biometrical recognition of humans, medical picture processing, etc.

The state of the art comprises a great number of classificators, e. g.

- statistical classificators (Gaussian distribution classificators)
- neuronic networks
- synergistic algorithms
- next-neighbor classificator.

A standard literature in the field of pattern recognition is Nieman, "Klassifikation von Mustern", Springer Verlag, 1983.

It is an object of the present invention to further improve classification quality by providing new classificators or new basic formulations of a classification.

This object is solved by one of claim 1 and 10.

Explanations are intended to contribute to a better comprehension of the technical terms used in the claims.

Identification (or Classification) of n Classes:

After providing n classes from a predetermined representative off-hand sample in a so-called learning process, an association/classification of a (still) unknown pattern into a certain class is called 'identification'. By introducing a rejection threshold, a pattern may be rejected as unknown. If it approximates a rejection class more closely than one of learned and known target classes of said identification, it is classified into said rejection class. A rejection threshold and a rejection class may be provided alternatively and cumulatively. A pattern is regarded as a "rejected pattern" (object or person), if all "rejections" provided (at least one of a threshold and a class) have responded. A precondition for a successful "identification" is that the test pattern provides sufficient information for a clear association to one of said n classes of the learning process.

Verification:

An identification with n=1 is made by an a priori (previous) knowledge concerning the target class, i. e. like a binary decision, (only) an acceptance or a rejection of the test pattern (patterns used for the test, shortly: "test pattern") may result.

FAR, FRR, Quality Function:

FAR (false acceptance rate) designates the rate of patterns identified false; FRR (false rejection rate) designates the rate of patterns rejected false. A quality function G=G (FAR,FRR) indicates the quality of a classification process, e. g. G=1−FAR−FRR. The more precise a classification, the closer G approaches "one". A weighting of FAR and FRR may have an influence if one or the other parameter FAR, FRR shall be accentuated, e. g. by indicating an average value with weighting factors $g_1, g_2$, e. g. $(g_1 \cdot FAR + g_2 \cdot FRR)/(g_1 + g_2)$. In practical applications, FRR may be of more importance, so that e. g. $g_2=2$ and $g_1=1$ may be selected to make said quality G "measurable" and to be able to compare identifications.

The method according to the invention serves to improve classification quality.

(a) In a first step, an 'identification' of n classes is provided, said identification being improved by a double use of a provided information. For this purpose, an information content of a test pattern is split into a necessary and a sufficient portion to be associated to a class. With said necessary portion, a preselection (pre-classification) of the classes to be considered may be effected. With said method, no precise (but rather an imprecise) classification is obtained, but the number of classes to be really considered for the pattern is substantially limited or reduced. Said step provides a "better" identification (in the meaning of the above quality function G).

(b) In a second step, classification quality is improved by an (additional) rejection class. Said class serves to support a rejection, i. e. in addition to rejections obtained for instance by threshold decisions, a particular rejection class is equally entitled with respect to the identification classes (the concrete target classes), into which a classification may be effected. With said rejection class, an a priori (previous) knowledge concerning the objects/persons (general term: patterns) to be rejected is taken into consideration insofar as e. g. a representative profile of the "patterns" to be rejected is learned into said rejection class and is therefore known to the classificator.

The composition of the rejection class is "subject to success", i. e. (in the meaning of the quality function) a better solution of the classification problem has to be provided by using said rejection class. When patterns to be rejected are e. g. known, they may all be learned into said rejection class. But usually, only a certain portion thereof is necessary for an improved rejection class, another portion may for example originate from a data base not relating to this problem at all.

For the selection of patterns to be rejected, selection methods may be used, e. g. testing all possibilities and using those data sets (of patterns) which yield the best result.

In the following, the invention(s) is (are) specified and supplemented by several embodiments.

FIG. 1 is a graphic embodiment of a classification being provided with a rejection class.

A defined learning and classification process comprises the following steps:

Providing digital data (sets) of a classification problem.

Defining identification classes $K_1, \ldots, K_n$ by a representative off-hand sample of each class (usual learning process).

For each subset of $\{K_1, \ldots, K_n\}$ a rejection class is determined, delimiting the totality of all possible test patterns from said subset. For this purpose, at least one of the data sets of the other classes and possible rejection candidates may be used.

Calculating a necessary information content. The features may be quite different, however—in order to be suitable—they may be used for a limitation in a pre-classification 20.

By considering the necessary condition, an identification of n classes is attributed to a classification 30 of a lower degree m (at best m=1).

A second step comprises an identification/verification 40, which additionally is provided with a rejection class 10.

When a classification into one of said m classes $K_1 \ldots K_m$ is made, an object or a person is regarded as recognized; when a classification into said rejection class 10 is made or when a rejection threshold is crossed, said object or said person is rejected.

A pertinent example of said first step may be explained with regard to the difference of speech recognition and speaker recognition:

Speech Recognition:
A spoken word is identified—as independently as possible from a specific speaker—by using signal processing methods.
Speaker Recognition:
The recording of a speech signal is associated with a speaker—as independently as possible from the content.

The object to be achieved is a reliable speaker identification serving for example as an admission control.

In the first embodiment, the speakers have to pronounce their surname to be identified.

A necessary precondition for identifying really e. g. Mr. Maier[1] is, that the name "Maier" has been pronounced. In a speech recognition, only those classes are considered which phonetically sound like "Maier". In this embodiment, a reduction to n=1 is not provided, as also Mrs. Maier or Mr. Meyer, who are to be identified as well, belong to the (phonetic) sub-selection "Maier" and may be mixed up with regard to classification. Only a subsequent speaker identification results in a clear association. Therefore, the first embodiment, in relation to a speech recognition, describes a necessary information portion, to previously separate all non-"Maier", not phonetically sounding like "Maier".

[1] n.b.: Maier, Meier, Mayr, Mayer, Meyer, Mayer are very common German surnames having several spellings, but may not be translated into an English synonym. It is left in the translation as it is in the original PCT application. (the translator).

In the second embodiment, the speakers must indicate a definite code word, specific for the person, e. g. a sequence of numbers. With a previous speech recognition, a reduction of the identification problem to n=1 was obtained, i. e. now, it is only necessary to effect a verification based on a sufficient information content, the necessary information content having been evaluated before.

Although, in prior art better solutions for speech recognitions than for speaker recognitions are known, a mere speaker recognition quickly reaches its limits due to restricted calculating capacity, as a learning pattern has to be compared with each class (example: bank customers). However, the FAR as well as the FRR decrease with a smaller number of classes. E. g. in a mere identification case of 66 persons, a system "SESAM" according to DE 44 13 788.5 (or WO 95/25316) provides a quality function ($G_{sesam}$=1−FRR+FAR) of less than 80% in an acoustic range, whereas a verification increases the quality function to 97.2%.

A third embodiment is to describe the additional use of a rejection class. In a biometrical identification of persons, each authorized person has an identification class. A rejection class is provided by a selection of a large pool of personal data sets. Besides said identification classes, said rejection class represents "the rest of the world", figuratively often described with "for the rest". Thus, unauthorized persons which have erroneously not been rejected, are classified into said rejection class and are thereby correctly rejected.

In case of e. g. 10 pictures (patterns) of a person to be verified and a pool of 200 pictures (patterns) of a representative off-hand sample of the population, biometrical data of mimicry, visual aspects and acoustics are used as features. Further, an off-hand test pattern of 20 pictures of the person to be verified and 100 pictures of unknown persons are present. The pictures of "the pool" are learned into said rejection class, leading to an optimum result on the off-hand test sample, i. e. a quality function G is maximized. It is obvious that for the figures of this embodiment, rapid selection methods are used, a verification requiring $2^{200}$ tests.

Until now, non-authorized persons could only be rejected with a rejection threshold; however, dependent on said threshold, a high FAR or FRR and thus a low quality value G is obtained.

The object of the invention is to further improve a classification quality of in an identification, by providing one of new classificators and new principle formulations of a classification statement. The invention proposes a classification method comprising two steps, said method evaluating an information content of a pattern (object or person) in two information portions. Said first information portion comprising necessary information and said second information portion comprising sufficient information. With said necessary information portion, a still imprecise preselection concerning several, but a substantially limited number of classes is made. Said preselection is followed by an identification with said sufficient information portion, to concretize said still imprecise preselection with regard to a real target class.

We claim:

1. A method for classifying patterns to at least one real target class, said patterns having an information content and said content of a pattern to be classified being actively split into first and second information portions, said first information portion containing necessary information and said second information portion containing sufficient information, said method comprising two steps:
   (a) a preselection is made using said necessary information portion, said preselection being initially imprecise and concerning a substantially limited number of classes;
   (b) said preselection is followed by an identification step using said sufficient information portion to concretize said initially imprecise preselection with regard to one of said real target classes contained in said limited number of classes.

2. The method of claim 1 comprising a rejection class provided as an available class for an initial association of such patterns which are to be rejected with at least good probability, as a result of a previous knowledge learned into said rejection class.

3. The method of claim 2 wherein said rejection class is equally entitled in relation to the other classes of a respective method step.

4. The method of claim 3, wherein said rejection class is provided in said second method step and is equally entitled in relation to one of said target classes.

5. The method of claim 2, wherein a first number of patterns is present, being only partly learned into said rejection class, resulting in a second number of patterns to obtain an optimized result of the second number of patterns, whereby a third number of patterns not being attributable to said rejection class is present in said first and second numbers of patterns, said third number being smaller than said second number and said second number being smaller than said first number.

6. The method of claim 1 wherein a previous knowledge is learned into a rejection class before starting said second method step, using a representative profile of patterns not being associatable to classes of a positively classifying identification.

7. The method of claim 6, wherein said representative profile of patterns are patterns to be reliably rejected.

8. The method of claim 1 having at least two subsets within the target classes of the identification step, wherein an individual rejection class is learned or defined previously for each subset.

9. The method of claim 8 wherein one of said subsets relates to said imprecise preselection concerning the limitation of possible classes for the subsequent identification into a respective target class as a final classification.

10. The method of claim 1 wherein with said necessary information, a classification problem is reduced to a still necessary identification problem of a considerably lower degree.

11. The method of claim 10 wherein said identification is a verification of said imprecise preselection, by evaluating only said sufficient information portion.

12. Apparatus comprising a calculating unit, an input unit and an output unit, said calculating unit being programmed to operate for classifying patterns to at least one real target class, said patterns having an information content and said information content of a pattern to be classified being actively split into first and second information portions, said first information portion containing a necessary information and said second information portion containing a sufficient information, said program comprises two steps:

(i) a preselection is made using said necessary information portion, said preselection being initially imprecise and concerning a substantially limited number of classes;

(ii) said preselection is followed by an identification step using said sufficient information portion to concretize said initially imprecise preselection with regard to one of said real target classes contained in said limited number of classes.

13. The apparatus of claim 12, comprising an information splitting unit, separating necessary information and sufficient information to provide a first classification unit with a first information portion and an identification unit with a sufficient information portion, said two portions being smaller than the total information of a pattern to be classified.

14. The apparatus of claim 12, wherein in addition to said at least one target class, a rejection class is defined as a storage area, said rejection class being equivalent in function with respect to said target class, but being larger to include all patterns not to be associated to said target class.

15. The apparatus of claim 12, wherein in addition to said at least one target class, a rejection class is defined as a storage area, said rejection class being equivalent in hierarchy with respect to said target class, but being larger to include all patterns not to be associated to said target class.

* * * * *